United States Patent
Chen et al.

(10) Patent No.: US 9,590,484 B2
(45) Date of Patent: Mar. 7, 2017

(54) INVERTER DEVICE AND POWER CONVERTING METHOD THEREOF

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 136 days.

(21) Appl. No.: 14/623,502

(22) Filed: Feb. 17, 2015

(65) Prior Publication Data
US 2015/0244249 A1 Aug. 27, 2015

Related U.S. Application Data

(60) Provisional application No. 61/944,587, filed on Feb. 26, 2014.

(30) Foreign Application Priority Data

Jan. 22, 2015 (CN) .......................... 2015 1 0031553

(51) Int. Cl.
- *H02M 1/12* (2006.01)
- *H02M 7/5395* (2006.01)
- *H02J 3/01* (2006.01)
- *H02J 3/38* (2006.01)
- *H02M 7/44* (2006.01)

(52) U.S. Cl.
CPC ................. *H02M 1/12* (2013.01); *H02J 3/01* (2013.01); *H02J 3/383* (2013.01); *H02M 7/5395* (2013.01); *H02M 7/44* (2013.01)

(58) Field of Classification Search
CPC .......... H02M 1/12; H02M 7/44; H02M 7/537; H02M 7/5395; H02J 3/01; H02J 3/383
See application file for complete search history.

(56) References Cited

U.S. PATENT DOCUMENTS

| | | | | |
|---|---|---|---|---|
| 5,327,335 A * | 7/1994 | Maddali | .............. | H02M 7/5395 363/132 |
| 5,377,092 A * | 12/1994 | Rowand, Jr. | .............. | H02J 3/01 363/39 |
| 6,134,127 A * | 10/2000 | Kirchberg | ............... | H02M 1/12 363/41 |
| 6,556,461 B1 * | 4/2003 | Khersonsky | ............ | H02M 7/49 363/41 |
| 2008/0308141 A1 * | 12/2008 | de Rooij | .................. | H02J 3/01 136/243 |
| 2011/0279071 A1 * | 11/2011 | Yamada | .............. | H02P 21/0021 318/400.02 |
| 2013/0155732 A1 * | 6/2013 | Wagoner | ............. | H02M 7/4807 363/40 |
| 2014/0063873 A1 * | 3/2014 | Acker | ..................... | H02M 7/04 363/40 |

(Continued)

*Primary Examiner* — Fred E Finch, III
(74) *Attorney, Agent, or Firm* — Jianq Chyun IP Office

(57) ABSTRACT

The invention is directed to an inverter device and a power converting method thereof. A control unit adjusts a pulse width modulation (PWM) signal serving to control power conversion of an inverter circuit according to a current harmonic component detected by a detection unit to generate an offset current to be superposed to an AC current output by the inverter circuit.

9 Claims, 3 Drawing Sheets

(56) References Cited

U.S. PATENT DOCUMENTS

| | | | |
|---|---|---|---|
| 2014/0070755 A1* | 3/2014 | Baek | H02P 27/08 318/798 |
| 2014/0328092 A1* | 11/2014 | Yokokawa | H02M 7/53875 363/41 |
| 2015/0207398 A1* | 7/2015 | Proca | H02M 7/48 363/41 |

* cited by examiner

INVERTER DEVICE AND POWER CONVERTING METHOD THEREOF

CROSS-REFERENCE TO RELATED APPLICATION

This application claims the priority benefits of U.S. provisional application Ser. No. 61/944,587, filed on Feb. 26, 2014, and China application serial no. 201510031553.8, filed on Jan. 22, 2015. The entirety of each of the above-mentioned patent applications is hereby incorporated by reference herein and made a part of this specification.

BACKGROUND

Field of the Invention

The invention is directed to an electronic device and more particularly, to an inverter device and a power converting method thereof.

Description of Related Art

An inverter is a power conversion device, which is commonly used to convert DC input power into AC output power by means of switching a power semiconductor element. An output terminal of a general type grid-connected inverter device is connected to an electronic grid, and when the inverter device fails or is forced to shut down, a current of an electric supply returns to the inverter device, which may cause damage to an inverter of the inverter device. In order to avoid the aforementioned situation, an inverter operated in a boundary conduction mode (BCM) may be instructed to stop its operation near a zero crossing point. This method can facilitate in effectively preventing the inverter from being damaged due to the returning current of the electric power; however, a harmonic wave generated due to the stop of the inverter which leads to greater total harmonic distortion of the current.

SUMMARY

The invention is directed to an inverter device and a power converting method thereof capable of effectively reducing total harmonic distortion of a current of the inverter device.

According to an embodiment, the invention provides an inverter device, including an inverter circuit, detection unit and a control unit. The inverter circuit receives DC power and converts the DC power into AC power. The detection unit detects a current harmonic component of an AC current of the AC power and generates a current adjustment signal according to the current harmonic component. The control unit is coupled to the inverter circuit and the detection unit, outputs a pulse width modulation (PWM) signal to control the inverter circuit to convert the DC power into the AC power and generates an offset current to be superposed to the AC current according to the current adjustment signal.

In an embodiment of the invention, the control unit adjusts a duty cycle of the PWM signal according to the AC current superposed with the offset current.

In an embodiment of the invention, the detection unit further determines whether a current root mean square (RMS) value of the current harmonic component is greater than a predetermined threshold. The detection unit generates the current adjustment signal according to a ratio of the current RMS value of the current harmonic component to a current RMS value of the AC current if the current RMS value of the current harmonic component is greater than the predetermined threshold.

In an embodiment of the invention, a current RMS value of the offset current is equal to the current RMS value of the current harmonic component.

In an embodiment of the invention, a frequency of the offset current is equal to a frequency of the current harmonic component.

In an embodiment of the invention, the current harmonic component is an odd-order current harmonic component.

In an embodiment of the invention, the detection unit is integrated inside the control unit or disposed outside the control unit.

According to an embodiment, the invention provides a power converting method of an inverter device, in which the inverter device is configured to convert DC power into AC power. The power converting method of the inverter device includes the following steps. A current harmonic component of an AC current of the AC power is detected. A current adjustment signal is generated according to the current harmonic component. An offset current is generated according to the current adjustment signal, and the offset current is superposed to the AC current. A duty cycle of the PWM signal is adjusted according to the superposed AC current. The inverter device is controlled to output the AC current according to the PWM signal.

In an embodiment of the invention, the step of generating the current adjustment signal according to the current harmonic component includes the following steps. Whether the current RMS value of the current harmonic component is greater than a predetermined threshold is determined. If the current RMS value of the current harmonic component is greater than the predetermined threshold, the current adjustment signal is generated according to a ratio of the current RMS value of the current harmonic component to a current RMS value of the AC current.

In an embodiment of the invention, a current RMS value of the offset current is equal to the current RMS value of the current harmonic component.

In an embodiment of the invention, a frequency of the offset current is equal to a frequency of the current harmonic component.

To sum up, in the embodiments of the invention, the PWM signal serving to control the inverter circuit for the voltage conversion is adjusted according to the detected current harmonic component to generate the offset current for offsetting the current harmonic component, so as to effectively reduce the total harmonic distortion of the current of the inverter device.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
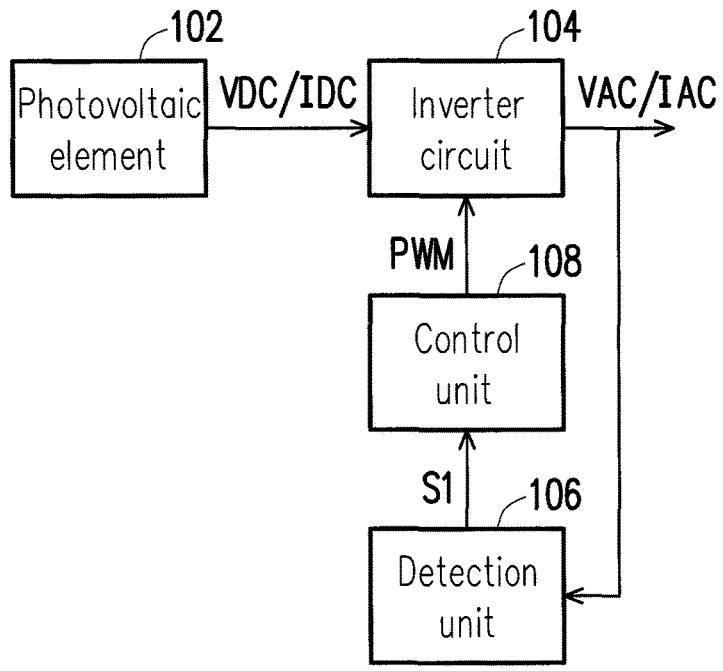
FIG. 1 is a schematic diagram illustrating an inverter device applied in a photovoltaic system according to an embodiment of the invention.

FIG. 1 is a schematic diagram illustrating an inverter device applied in a photovoltaic system according to an embodiment of the invention. Referring to FIG. 1, an inverter device includes an inverter circuit 104, a detection unit 106 and a control unit 108. The inverter circuit 104 is coupled to a photovoltaic element 102. The control unit 108 is coupled to the inverter circuit 104 and the detection unit 106. The detection unit 106 is coupled to an output terminal of the inverter circuit 104. The photovoltaic element 102 is configured to convert the sunlight into DC power (including a DC voltage VDC and a DC current IDC), and the inverter circuit 104 is configured to receive the DC power from the photovoltaic element 102 and convert the DC power into AC power (including an AC voltage VAC and an AC current IAC). In addition, a switch (which is not shown) of the inverter circuit 104 is controlled by the control unit 108 to turn on or turn off, so as to convert the DC power into the AC power. In the present embodiment, the detection unit 106 is configured outside the control unit 108, but the invention is not limited thereto, and the detection unit 106 may also be integrated inside the control unit 108.

The detection unit 106 detects the AC current IAC output by the inverter circuit 104 to obtain a current harmonic component of the AC current IAC and generates a current adjustment signal S1 to the control unit 108. The current harmonic component may be generated due to, for example, the stop of the inverter circuit 104, voltage waveform distortion or the switching of the switches. Furthermore, a method of the detection unit 106 generating the current adjustment signal S1 may be, for example, determining whether a current root mean square (RMS) value of the detected current harmonic component is greater than a predetermined threshold and generating the current adjustment signal S1 according to a ratio of the current RMS value of the current harmonic component to a current RMS value of the AC current when current RMS value of the current harmonic component is greater than the predetermined threshold.

The control unit 108 is configured to output a pulse width modulation (PWM) signal PWM to the inverter circuit 104 to control the inverter circuit 104 to convert the DC voltage VDC into the AC voltage VAC and adjusts a duty cycle of the PWM signal PWM according to the current adjustment signal S1 output by the detection unit 106 to generate an offset current for offsetting the current harmonic component. Namely, the control unit 108 adjusts the duty cycle of the PWM signal PWM according to the current adjustment signal S1 to superpose the offset current to the AC current IAC. The superposed AC current includes the AC current IAC and the offset current which may serve to offset the current harmonic component, such that the current harmonic component of the AC current IAC output by the inverter circuit 104 becomes smaller. A current RMS value of the offset current is equal to the current RMS value of the current harmonic component, and a frequency of the offset current is equal to a frequency of the current harmonic component.

Figure 2:
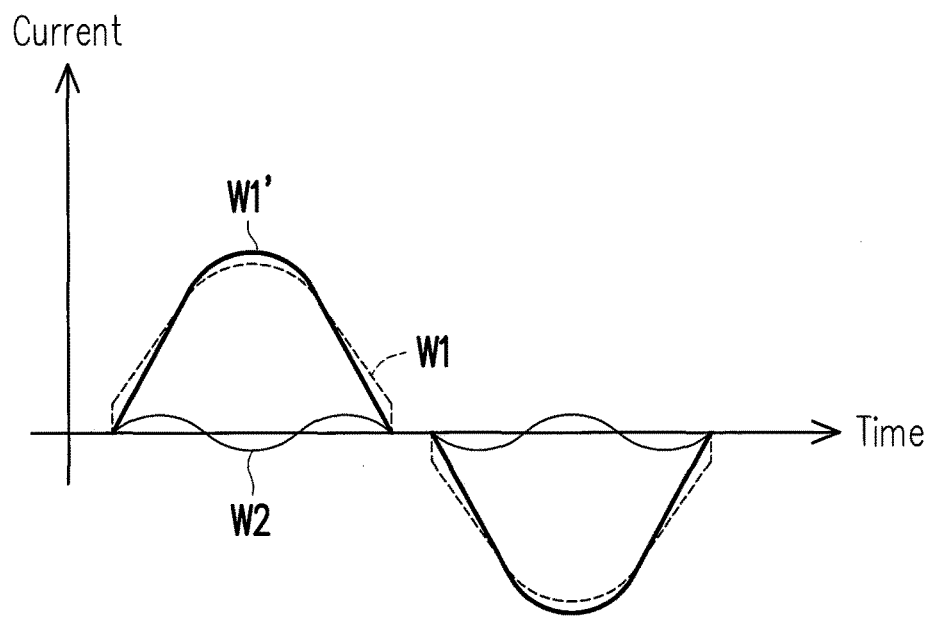
FIG. 2 is a schematic waveform diagram of the offset current and the AC current according to an embodiment of the invention.

For example, FIG. 2 is a schematic waveform diagram of the offset current and the AC current according to an embodiment of the invention. Referring to FIG. 2 in the present embodiment, the control unit 108 instructs the inverter operating in a boundary conduction mode (BCM) to stop operation near a zero crossing point to prevent the inverter circuit 104 from being damaged. In FIG. 2, a waveform W1 represents the AC current IAC output by the inverter circuit 104, a sine wave W2 represents the offset current generated according to the current adjustment signal S1 by the control unit 108, and a waveform WP represents a waveform, i.e., a waveform of the superposed AC current after the waveform W1 is added with the sine wave W2, namely, after the AC current IAC is superposed with the offset current for offsetting the current harmonic component.

In the present embodiment, the current RMS value of the AC current is 1 A, the predetermined threshold of the current RMS value is 0.2 A, and the current RMS value of the AC current of the current harmonic component detected by the detection unit 106 is 0.4 A, a number of orders of the AC current is 3, and the frequency of the current harmonic component is 180 Hz. Since the current RMS value of the AC current of the current harmonic component is greater than the predetermined threshold, the control unit 108, in this case, may adjust duty cycle of the PWM signal PWM according to the current adjustment signal S1 output by the detection unit 106 to generate an offset current (i.e., the sine wave W2) which has the same number of orders (i.e., 3 orders), the same frequency (i.e., 180 Hz) and the current RMS value of 0.4 A as the current harmonic component detected by the detection unit 106 to offset the current harmonic component, so as to reduce total harmonic distortion of the current.

It should be noted that in the present embodiment, the current harmonic component having 3 orders is illustrated as an example for describing the offsetting of the current harmonic component; however, the number of orders of the current harmonic component is not limited to the present embodiment, and in other embodiments, the current harmonic component may have orders in a greater odd number (e.g., 5, 7 and so on) or in an even number, and the AC current may simultaneously have current harmonic components with different numbers of orders.

Figure 3:
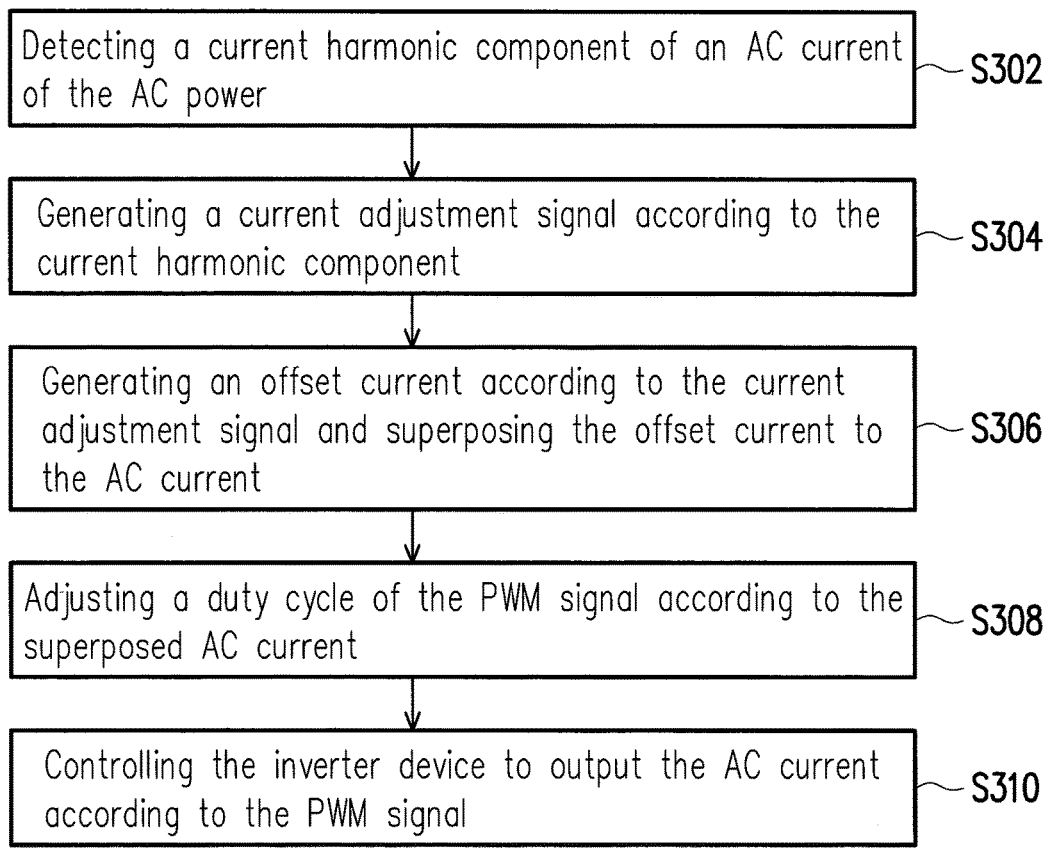
FIG. 3 is a schematic flowchart illustrating a power converting method of an inverter device according to an embodiment of the invention.

FIG. 3 is a schematic flowchart illustrating a power converting method of an inverter device according to an embodiment of the invention. Referring to FIG. 3, according to the embodiments above, the power converting method of the inverter device includes the following steps. First, a current harmonic component of an AC current of AC power is detected (step S302). The current harmonic component may be in an odd or an even number of orders. Then, a current adjustment signal is generated according to the current harmonic component (step S304). Thereafter, an offset current is generated according to the current adjustment signal, and the offset current is superposed to the AC current (step S306). Afterwards, a duty cycle of a PWM signal is adjusted according to the superposed AC current (step S308). Lastly, the AC current output by the inverter device is controlled according to the PWM signal (step S310) to generate the offset current to offset the current harmonic component, in which a current RMS value of the offset current is equal to a current RMS value of the current harmonic component, and a frequency of the offset current is equal to a frequency of the current harmonic component.

Figure 4:
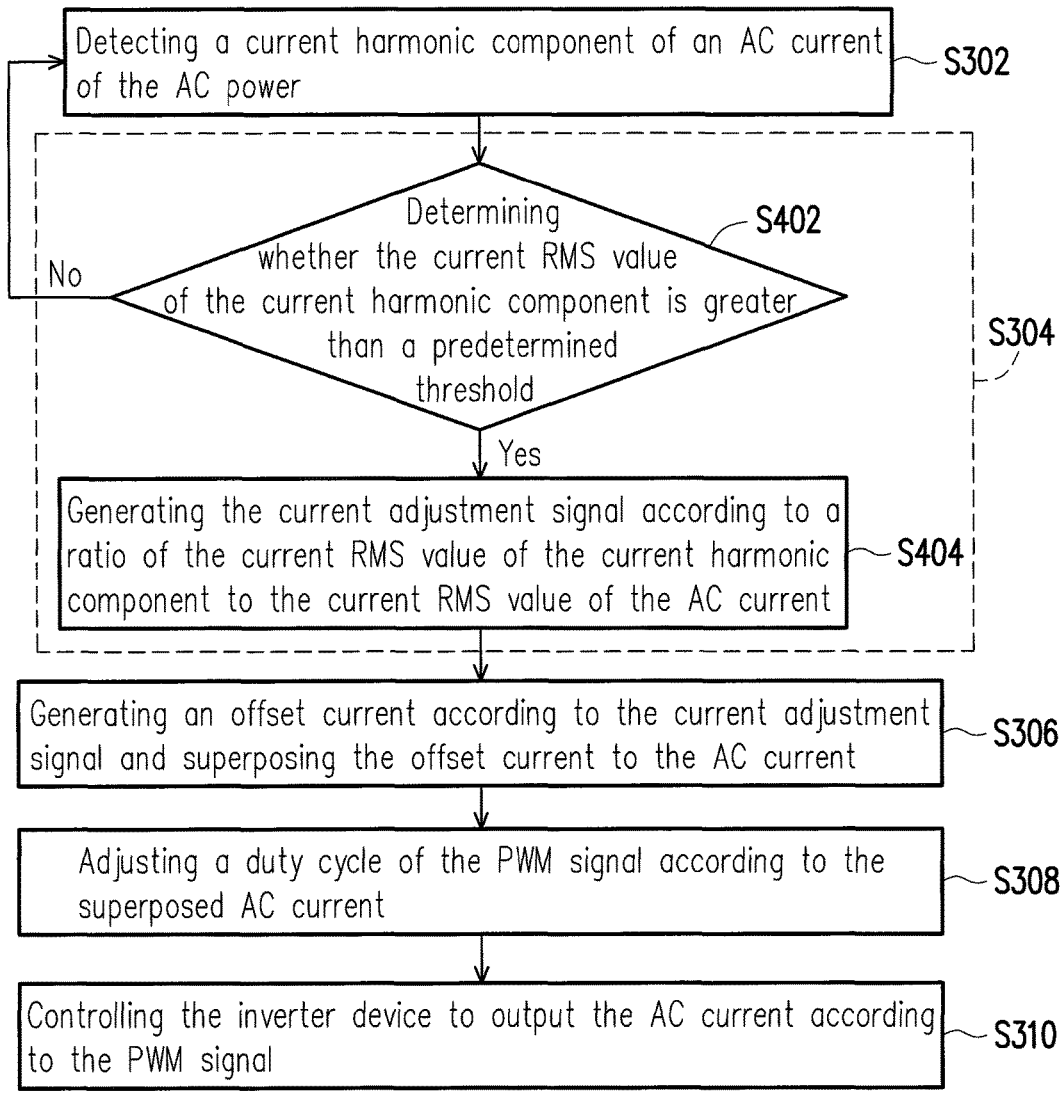
FIG. 4 is a schematic flowchart illustrating a power converting method of an inverter device according to another embodiment of the invention.

FIG. 4 is a schematic flowchart illustrating a power converting method of an inverter device according to another embodiment of the invention. Referring to FIG. 4, additionally, the step (i.e., step S304) of generating the current adjustment signal according to the current harmonic component in FIG. 3 may include step S402 and step S404 illustrated in FIG. 4. Namely, whether the current RMS value of the current harmonic component is greater than a predetermined threshold is first determined (step S402). If the current RMS value of the current harmonic component is greater than the predetermined threshold, the current adjustment signal is generated according to a ratio of the current RMS value of the current harmonic component to the current RMS value of the AC current (step S404). Then, step S306 is entered, where the offset current is generated according to the current adjustment signal, and the offset current is superposed to the AC current. Otherwise, if the current RMS value of the current harmonic component is not greater than the predetermined threshold, the method returns to the step S302, where the current harmonic component of the AC current of the AC power is detected.

To summarize, in the inverter device and the power converting method thereof according to the embodiments of the invention, the control unit can generate the offset current for offsetting the current harmonic component according to the current harmonic component of the AC current to superpose the offset current to the AC current and adjust PWM signal serving to control the power conversion of the inverter circuit according to the superposed AC current, so as to effectively reduce the total harmonic distortion of the current of the inverter device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An inverter device, comprising:
   an inverter circuit, receiving a DC power and converting the DC power into an AC power;
   a detection unit, detecting a current harmonic component of an AC current of the AC power and generating a current adjustment signal according to the current harmonic component; and
   a control unit, coupled to the inverter circuit and the detection unit, outputting a pulse width modulation (PWM) signal to control the inverter circuit to convert the DC power into the AC power, controlling the inverter circuit to stop operation near a zero crossing point, and generating an offset current to be superposed to the AC current according to the current adjustment signal,
   wherein the detection unit further determines whether a current root mean square (RMS) value of the current harmonic component is greater than a predetermined threshold and generates the current adjustment signal according to a ratio of the current RMS value of the current harmonic component to a current RMS value of the AC current if the current RMS value of the current harmonic component is greater than the predetermined threshold.

2. The inverter device according to claim 1, wherein the control unit adjusts a duty cycle of the PWM signal according to the AC current superposed with the offset current.

3. The inverter device according to claim 1, wherein a current RMS value of the offset current is equal to the current RMS value of the current harmonic component.

4. The inverter device according to claim 1, wherein a frequency of the offset current is equal to a frequency of the current harmonic component.

5. The inverter device according to claim 1, wherein the current harmonic component is an odd-order current harmonic component.

6. The inverter device according to claim 1, wherein the detection unit is integrated inside the control unit.

7. A power converting method of an inverter device, wherein the inverter device is configured to convert a DC power into an AC power and stop operation near a zero crossing point, the power converting method comprising:
   detecting a current harmonic component of an AC current of the AC power;
   generating a current adjustment signal according to the current harmonic component;
   generating an offset current according to the current adjustment signal and superposing the offset current to the AC current;
   adjusting a duty cycle of a PWM signal according to the superposed AC current; and
   controlling the inverter device to output the AC current according to the PWM signal,
   wherein the step of generating the current adjustment signal according to the current harmonic component comprises:
   determining whether a current RMS value of the current harmonic component is greater than a predetermined threshold; and
   if the current RMS value of the current harmonic component is greater than the predetermined threshold, generating the current adjustment signal according to a ratio of the current RMS value of the current harmonic component to a current RMS value of the AC current.

8. The power converting method according to claim 7, wherein a current RMS value of the offset current is equal to the current RMS value of the current harmonic component.

9. The power converting method according to claim 7, wherein a frequency of the offset current is equal to a frequency of the current harmonic component.

* * * * *